United States Patent

[11] 3,601,501

| [72] | Inventors | John G. Johnson<br>Rte. 2, Box 18, Waynesboro, Va. 22980;<br>James H. Anderson, 1615 Hillock Lane,<br>York, Pa. 17403 |
|---|---|---|
| [21] | Appl. No. | 14,470 |
| [22] | Filed | Feb. 26, 1970 |
| [45] | Patented | Aug. 24, 1971 |

[54] GAS COMPRESSOR IMPELLER AND SHAFT ASSEMBLY
6 Claims, 3 Drawing Figs.

| [52] | U.S. Cl. | 416/244, 287/53 |
|---|---|---|
| [51] | Int. Cl. | F04d 29/00, B63b 1/00, F16d 1/06 |
| [50] | Field of Search | 415/213; 416/244; 287/53 R, 53 S, 53 TK |

[56] References Cited
UNITED STATES PATENTS

| 776,935 | 12/1904 | Pugh | 287/53 R |
|---|---|---|---|
| 924,334 | 6/1909 | Fouch | 287/53 R |
| 2,345,910 | 4/1944 | Fawcett | 287/53 R |
| 2,602,683 | 7/1952 | Awe | 287/53 R |
| 2,726,524 | 12/1955 | Gorin | 287/53 R |
| 3,467,419 | 9/1969 | Anderson et al. | 287/53 R |
| 2,351,356 | 6/1944 | Meyer | 287/53 R |

*Primary Examiner*—Henry F. Raduazo
*Attorneys*—F. H. Henson and F. E. Blake

ABSTRACT: A centrifugal gas compressor impeller is assembled to a rotatable shaft with two friction washers having conical surfaces mating with respective opposite conical surfaces of the impeller that are concentric to a central impeller aperture through which a threaded bolt is passed and threaded into a threaded aperture at the end of the rotatable shaft. The angles of concentricity for the conical surfaces of the washer are slightly different than the angles of concentricity of the mating impeller surfaces so that a friction lock is obtained between the shaft and impeller and also the impeller and washer apertures are slightly larger than the bolt shaft diameter so that an impeller centering relative to the shaft is assured during assembly.

PATENTED AUG 24 1971 3,601,501

WITNESSES
Alfred G. Colaizzi
James F. Young

INVENTORS
James H. Anderson
John G. Johnson

Francis S. Blake
ATTORNEY

GAS COMPRESSOR IMPELLER AND SHAFT ASSEMBLY

CROSS-REFERENCES TO RELATED PATENT APPLICATIONS

An air-conditioning machine compressor using the impeller and shaft assembly of this invention is disclosed in the copending patent application WE-41,522 but it should be clearly understood that the impeller and shaft assembly of this invention may be used with any gas compressor structure for any purposes.

BACKGROUND OF THE INVENTION

Centrifugal gas compressors are used in large air-conditioning machinery where their structural and mechanical advantages over the relatively complex reciprocating gas compressors are appreciated. Recent developments are making economically feasible the use of the centrifugal gas compressors in the smaller sizes of air-conditioning machines and of course smaller impeller and shaft assemblies are to be used. In the larger centrifugal gas compressors as previously used, the assembly of the rotatable shaft and impeller used various arrangements of splines to provide the connection and transmit the angular thrust from shaft to the impeller. With the smaller impeller and shaft assembly now to be used, the spline connection with the attendant machining requirements presents problems which it would be desirable to avoid.

PRIOR ART

Applicants are not aware of any prior disclosures of the use of a friction coupling in an impeller and shaft assembly for a centrifugal gas compressor as described and claimed by the present invention.

SUMMARY

In accordance with the present invention a centrifugal gas compressor impeller and shaft assembly is comprised of a rotatable shaft having an internally threaded end to which the impeller is to be fastened by a cap bolt passing through a central aperture of the impeller. Opposite faces of the impeller are provided with central conical surfaces concentric with the aperture and these conical surfaces are preferably but not necessarily inclined upwardly such that the conical rear surface of the impeller is inclined towards the end of the shaft in the assembled relation and the conical front surface of the impeller is inclined away from the end of the shaft in the assembled relation. A friction washer is interposed between the bolt cap and the impeller front conical surface and is provided with a mating conical surface having a slightly different angle of concentricity which in the preferred form of the invention is slightly greater than the angle of concentricity of the impeller front conical surface. A friction collar washer is interposed between the rear conical surface of the impeller and the shaft end and is provided with a mating conical surface having a slightly different angle of concentricity which in the preferred form of the invention is slightly greater than the angle of concentricity of the impeller rear conical surface. Also the end of the friction collar washer adjacent the impeller shaft in the assembled relation is counterbored slightly to provide a collar surface to overlie the shaft end to thereby provide a friction grip on the shaft when the cap bolt is tightened to compress the friction washers and complete the assembly. In the preferred form of the invention, the apertures of the friction washers and the impeller are slightly larger than the diameter of the shaft of the cap bolt so that a centering of the impeller and shaft is obtained by the interactions of the concentric surfaces when the bolt is tightened to complete the assembly.

Further advantages and features of the invention will be apparent with reference to the following specification and drawings.

DESCRIPTION OF THE PREFERRED EMBODIMENT

Figure 1:
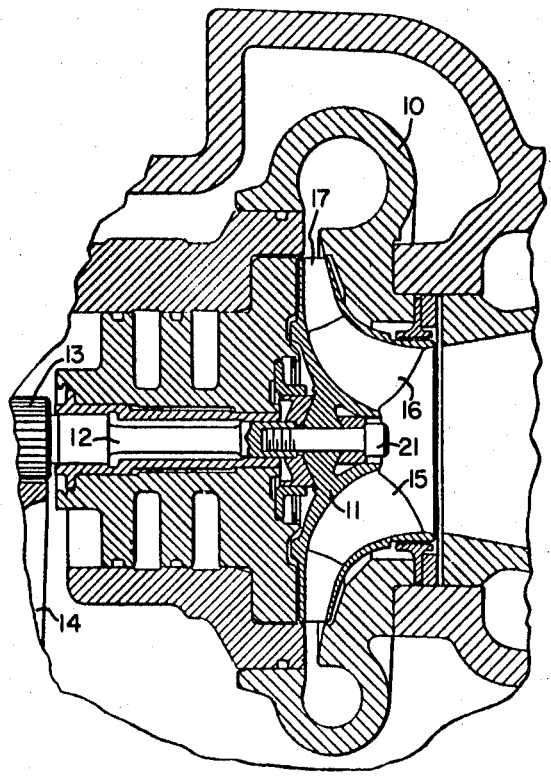
FIG. 1 is a fragmentary sectional side elevational view of a gas compressor for an air-conditioning machine employing the impeller and shaft assembly of the invention.

Referring to FIG. 1 of the drawings, the centrifugal gas compressor as may be used in an air-conditioning machine or the like is shown to include a compressed gas collecting scroll 10, and a centrifugal impeller 11 concentric therewith. The impeller 11 is secured to the end of a rotatable shaft 12 that is driven by the pinion gear 13 and the bull gear 14. Suitable bearings including thrust bearings at the end of the shaft (not shown) are provided for the impeller shaft 12 and since they do not form a part of the invention they will not be referred to in detail herein. The front face of the impeller 11 is provided with impeller walls or vane surfaces such as shown at 15 and 16 which lead to the peripheral discharge surfaces 17 adjacent the diffuser intake of the scroll 10.

Figure 2:
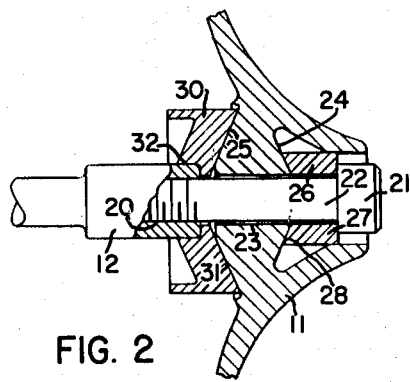
FIG. 2 is an enlarged side elevational view partly in section of the impeller and shaft assembly of the invention.
Figure 3:
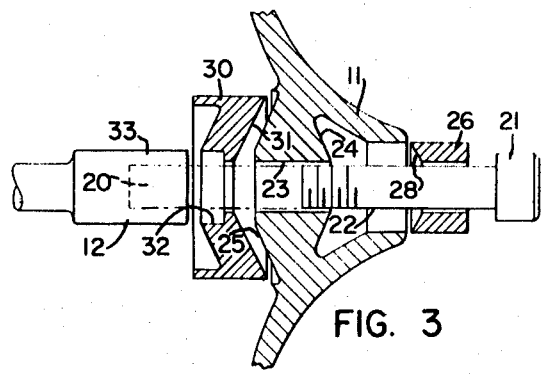
FIG. 3 is an exploded view similar to FIG. 2 but showing the parts in the disassembled relation prior to assembly.

Referring now to FIGS. 2 and 3 of the drawings for a detailed description of the impeller and shaft assembly of the invention, it will be seen that the rotatable shaft 12 is provided with an internally threaded bore or aperture 20 at its end to which the impeller 11 is to be secured. A cap bolt 21 having a threaded shaft 22 is passed through a central aperture 23 of the impeller 11 and is threaded into the threaded aperture 20 of the rotatable shaft 12. The front side of the impeller 11 is provided with a first conical surface 24 centrally located and concentric to the impeller aperture 23. The rear surface of the impeller 11 is also provided with a conical surface 25 that is centrally located and concentric to the impeller aperture 23. A friction washer 26 is interposed between the cap bolt 21 and the fist conical surface 24 on the front side of the impeller 11. The friction washer 26 is provided with a mating conical surface 28 that contacts the conical surface 24 of the impeller 11 in the assembled relation. A friction collar washer 30 is interposed between the rear conical surface 25 of the impeller and the threaded end of the rotatable shaft 12. The collar washer 30 is provided with a mating conical surface 31 that contacts the conical surface 25 on the rear of the impeller 11 in the assembled relation.

As more clearly shown by FIG. 3 of the drawings, the front conical surface 24 is inclined upwardly to extend away from the threaded end of the rotatable shaft 12 in the assembled relation while the rear conical surface 25 is also extended upwardly to extend towards the threaded end of the rotatable shaft 12 in the assembled relation. Although this is a preferred form of the invention, it should be understood that either of the conical surfaces 24 or 25 of the impeller may be inclined in other directions provided that the mating conical surfaces of the related friction washers are also similarly inclined. It should be pointed out however that the angle of concentricity for the inclined or conical surface 28 of the first friction washer 26 is slightly different than the angle of concentricity for the conical surface 28 of the impeller and also the angle of concentricity for the conical surface 31 of the second friction washer 30 is slightly different than the angle of concentricity for the rear conical surface 25 of the impeller 11.

In the preferred form of the invention, with the angles of inclination in the direction as described and shown for all of the respective conical surfaces, the angle of inclination for the conical surface 28 of the washer 26 is slightly greater from the vertical than the angle of inclination for the conical surface 24 of the impeller 11. Also, in the preferred form of the invention being described the angle of inclination for the conical surface 31 of the second washer 30 is slightly greater from the vertical than the angle of inclination for the conical surface 25 of the impeller 11. It should now be pointed out that the aperture of the washer 30 is counterbored as shown at 32 to provide a collar surface overlying and gripping the shaft end surface 33 of the shaft 12 in the assembled relation as shown by FIG. 2 of the drawings. When the cap bolt 21 is tightened to complete the assembly, the different angles of concentricity for the respective friction washers 26 and 30 cause the impeller 11 to be tightly gripped with the washers under compression and also cause the overlying collar surface 32 of the washer 30 to be compressed onto the shaft end surface 33, thus providing a very tight friction grip.

As is clearly shown by both FIGS. 2 and 3 of the drawings, the preferred form of the invention provides that the central apertures for the impeller 11 and the respective friction washers 26 and 30 are slightly larger in diameter than the diameter of the shaft 22 of the bolt 21. Thus, when assembling the impeller 11 on the end of the rotatable shaft 12 by tightening the bolt 21 the impeller 11 is free to move slightly and the interaction of the concentric surfaces of the impeller and washers provides an effective centering action for centering the impeller 11 relative to the shaft 12 and its threaded central aperture 20.

A very simple, compact and effective impeller and shaft assembly for a centrifugal gas impeller is obtained with the use of the friction washers having the conical surfaces mating with respective conical surfaces on opposite sides of the impeller as described above. Various modifications will occur to those skilled in the art. For example, although the cap bolt 21 has been specifically described, obviously a threaded stud with a nut may be used in place of the cap bolt.

We claim as our invention:

1. A rotatable gas compressor impeller and shaft assembly comprising, a rotatable shaft having a threaded axial bore at one end, an impeller having an axial bore therethrough and adapted to be assembled to the front of the threaded end of said shaft with a capped fastening bolt having a threaded shaft passing through the impeller axial bore and threaded into said shaft bore, the respective front and back faces of said impeller having respective first and second conical surfaces coaxial to the impeller bore and said surfaces being oppositely inclined, a first apertured friction washer adapted to receive the shaft of said bolt and to be interposed between the first conical surface of said impeller and the cap of said bolt and having a mating conical surface coaxial with its aperture adjacent the first conical surface in the assembled relation, the angle of inclination of the mating surface of the first washer being slightly different than the angle of inclination of the first conical surface of the impeller, a friction collar washer having an aperture adapted to receive the shaft of said bolt and to be interposed between the second conical surface of said impeller and the threaded end of said shaft and having a mating conical surface coaxial with its aperture adjacent the second conical surface in the assembled relation, the angle of inclination of the mating surface of the collar slightly slightl different than the angle of inclination of the second conical surface, and the aperture of said collar adjacent the end of said shaft being counterbored for a length sufficient to receive the impeller end of the shaft partly within the collar aperture with a portion of the collar overlying and gripping the shaft in the assembled relation.

2. The invention of claim 1 in which said first conical surface of the impeller is inclined away from the end of said shaft in the assembled relation, and said second conical surface of the impeller is inclined towards the end of said shaft in the assembled relation.

3. The invention of claim 2 in which the angle of inclination for the mating surface of said washer is slightly greater than the angle of inclination of said first conical surface, and the angle of inclination for the mating surface of said collar is slightly greater than the angle of inclination of said second conical surface.

4. The invention of claim 1 in which the diameters of the respective apertures of said washer and collar are oversize relative to the diameter of the threaded shaft of said fastening bolt, and the diameter of the bore of said impeller is oversize relative to the diameter of the threaded shaft of said fastening bolt whereby the impeller is centered relative to said shaft by the mating conical surfaces in the assembled relation.

5. The invention of claim 2 in which the diameters of the respective apertures of said washer and collar are oversize relative to the diameter of the threaded shaft of said fastening bolt, and the diameter of the bore of said impeller is oversize relative to the diameter of the threaded shaft of said fastening bolt whereby the impeller is centered relative to said shaft by the mating conical surfaces in the assembled relation.

6. The invention of claim 3 in which the diameters of the respective apertures of said washer and collar are oversize relative to the diameter of the threaded shaft of said fastening bolt, and the diameter of the bore of said impeller is oversize relative to the diameter of the threaded shaft of said fastening bolt whereby the impeller is centered relative to said shaft by the mating conical surfaces in the assembled relation.